United States Patent [19]

Muller

[11] 3,922,307

[45] Nov. 25, 1975

[54] PROCESS FOR PREPARING CYCLOHEXANEDIONES-(1,3)

[75] Inventor: Werner H. Müller, Kelkheim, Taunus, Germany

[73] Assignee: Hoechst Aktiengesellschaft, Frankfurt am Main, Germany

[22] Filed: Sept. 13, 1973

[21] Appl. No.: 396,983

[30] Foreign Application Priority Data

Sept. 15, 1972 Germany............................ 2245270

[52] U.S. Cl.............................. 260/586 C; 260/590
[51] Int. Cl.$^2$.......................................... C07C 45/00
[58] Field of Search........................ 260/586 R, 590

[56] References Cited

UNITED STATES PATENTS 3,595,930 7/1971 Hofmann et al. ........... 260/586 R X

OTHER PUBLICATIONS

Vorlander et al., "Justus Liebgs Annalen du Chemie," 294:270–271.

Bornstern et al., "Chem. Abstract" Vol. 48, p. 9933e (1954).

Kost et al., "Zhurnal Obshch Khim" Vol. 32, pp. 3983–3986, (1962) cited in C.A. 58:13808d.

Mannich et al., "Berichte" 71, pp. 2090–2091, (1938).

Primary Examiner—Norman P. Morgenstern
Attorney, Agent, or Firm—Curtis, Morris & Safford

[57] ABSTRACT

Process for preparing cyclohexanediones-(1,3) by reaction of a γ-acylcarboxylic acid ester with a strongly basic condensing agent, in the presence of a solvent consisting essentially of carboxylic acid amides, phosphoric acid amides, sulfoxides, sulfones or macrocyclic polyethers.

11 Claims, No Drawings

PROCESS FOR PREPARING CYCLOHEXANEDIONES-(1,3)

It is well known that cyclohexanediones-(1,3) can be prepared by cyclization of the corresponding ketocarboxylic acid esters with sodium alcoholates in diethyl ether or methanol.

These methods have the following drawbacks poor selectivity, insufficient space time-yields and difficult isolation of the cyclic diketones out of the oily reaction products (which also contain further by-products. These drawbacks prevent an economically reasonable production of cyclohexanediones-(1,3).

The cyclohexanediones-(1,3) may be transformed to technically important resorcinols.

A process has now been found for preparing cyclohexanediones-(1,3) having the formula

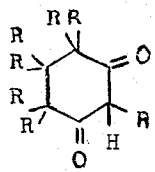

wherein the individual radicals R may be identical or different and represent — each — a hydrogen atom, an alkyl group or an aryl group, by reaction of a γ-acyl carboxylic acid ester having the formula

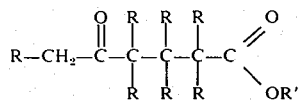

wherein R has the aforesaid meaning, and wherein R' is an alkyl or an aryl group with a strongly basic condensing agent in presence of a solvent, containing at least 50 % of a compound belonging to the following classes:

a. carboxylic acid amides having the formula

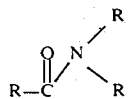

wherein the individual radicals R may be identical or different, meaning — each — a hydrogen atom, an alkyl group or an aryl group, b. phosphoric acid amides having the formula

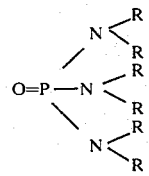

wherein the individual radicals R may be identical or different, meaning — each — an alkyl group or an aryl group, c. sulfoxides and sulfones having the formulae

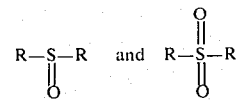

wherein the individual radicals R may be identical or different, meaning — each — an alkyl group or an aryl group, and d. macrocylic polyethers. As condensing agents may be used the strongly basic alkali metal or alkaline earth metal alcoholates, amides or hydrides. The alkali metals or alkaline earth metals themselves or their amalgams are also suitable, as well as alcoholic solutions of the alcoholates.

Particularly well suitable solvents, having the additional side effect of accelerating the cyclization reaction, are among the carboxylic acid amides: dimethyl formamide (DMF), dimethylacetamide (DMAC), N-methylpyrrolidone (NMP). A particularly well suited amide of phosphoric acid is hexamethyl phosphoric triamide.

When using as solvent a product of the sulfoxide or sulfone group, dimethyl-sulfoxide (DMSO) and sulfolane are preferred.

A macrocyclic polyether suitable as solvent is, for example, cyclohexyl-18-crown-6-ether

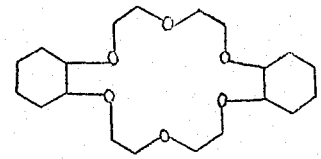

The amides of carboxylic acids and phosphoric acid, the sulfoxides, sulfones or macrocyclic polyethers may be used in admixture to other solvents. The quota of these latter may then amount up to 50 %, preferably up to 30 %. Suitable mixture components are, for example, methanol, diethyl ether, acetonitrile, and benzene.

Generally, the cyclization is performed at a temperature of from 0° to 150°C, preferably between 15° and 70°C, without pressure and either continuously or discontinuously. The solvent is generally used in an excess of from 10 : 1 to 10,000 : 1, based on the initial ester. The solvents may be used again after re-cyclization.

The reaction takes place with a high degree of selectivity (>95 %) and a high space-time-yield (>300 g/1.hr). Crystallized products of a highgrade purity are obtained. The reaction may be represented, for example, by the following formulae, providing thatγ-acetobutyric acid methyl ester is used:

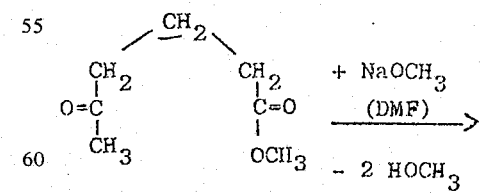

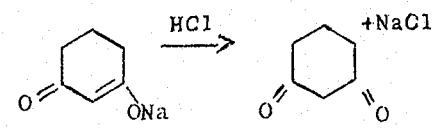

Particularly suitable initial materials are: γ-acetyl-butyric acid methyl ester, γ-acetyl-γ-phenyl butyric acid methyl ester, γ-acetyl-γ-propyl butyric acid ethyl ester.

The reaction may be performed, for example, as follows:

To a first introduced mixture of the condensation agent and of the solvent, the ester to be submitted to cyclization is continuously added, while stirring vigorously, at such a speed that the concentration in free ester is low. Since the solvents according to the invention cause the reaction to speed up considerably, the addition may take place very fast and the space-time-yields of from 600–1000 gr/l.hr. are obtained. As soon as a quantity of ester equimolar to the condensation agent is added the solvent is eliminated in vacuo. The salt, obtained as residue, is dissolved in a determined quantity of water and the solution is then acidified by a concentrated acid. During the cooling process the cyclic diketones precipitate in their pure crystal form. It is further possible to obtain a small percentage by extraction of the aqueous mother liquor. The net yields after re-crystallization amount to >95 %.

The following examples illustrate the invention:

EXAMPLES 1–2

A mixture of condensation agent and solvent is first introduced into a 1 ltr- 4-necked flask, equipped with a mechanical agitator, a dropping funnel, a thermometer, and a reflux condenser. To this mixture is added dropwise uniformly and over a definite period an equimolar quantity — calculated on the condensation agent — of acylbutyric acid ester, dissolved in a determined quantity of solvent. During this phase the temperature is checked by cooling, if necessary. The reaction is followed up by means of a gas chromatographic analysis. As long as some free condensation agent is still present, the reaction takes place practically spontaneously.

Once the reaction is terminated, the solvent is eliminated in vacuo, the residue digested with ether, dissolved in a small quantity of water and the solution acidified by concentrated hydrochloric acid. When using ether or methanol as solvent (examples 1 and 2), a yellow-brownish oil separates upon acidifying the aqueous alkali metal salt solution, from which a small amount of dihydroresorcinol is obtained by means of a cumbersome crystallization. The yield is abt. 37 %, resp. 14 %.

However, the reaction being performed in DMF, DMSO or DMAC, a practically pure crystalline dihydroresorcinol is obtained in a high yield. The result is similar with the use of mixtures of DMF/methanol and DMF/diethyl ether.

Additionally, it is possible to extract a small quantity from the aqueous phase by methylene chloride. The yield amounts to 95 % after re-crystallization.

Examples 1 – 8 Cyclization of γ-acetylbutyric acid methyl ester (γ-ABM) to yield dihydroresorcinol

| Example | Solvent (1) Kind | ml | -ABM[2] Solvent g/ml | Condensation- agent Kind | g | reaction time min |
|---|---|---|---|---|---|---|
| 1 | diethyl-ether | 450 | 48/50 | NaOCH$_3$ | 30 | 480 |
| 2 | methanol | 350 | 48/50 | NaOCH$_3$ | 20 | 360 |
| 3 | DMF | 250 | 48/50 | NaOCH$_3$ | 20 | 30 |
| 4 | DMF | 350 | 48/100 | NaOCH$_3$ | 20 | 60 |
| 5 | DMF | 250 | 72/70 | NaOCH$_3$ | 30 | 60 |
| 6 | DMSO | 250 | 48/100 | NaOCH$_3$ | 20 | 60 |
| 7 | DMSO | 250 | 48/100 | NaH | 10 | 60 |
| 8 | DMAC | 250 | 48/100 | NaOCH$_3$ | 20 | 60 |
| 9 | DMF/Methanol 5 : 1 | 240 | 48/80 | NaOCH$_3$ | 20 | 60 |
| 10 | DMF/diethyl-ether 5 : 1 | 240 | 48/80 | NaOCH$_3$ | 20 | 60 |

| Examples | temperature °C | H$_2$O[3] ml | conc.HCl[4] ml | yield[5] % of Theory | space-time yield g/l·h | melting point °C |
|---|---|---|---|---|---|---|
| 1 | 25–34.6 | 50 | 46 | 37 | 3 | 103 |
| 2 | 25 | 50 | 31 | 14.2 | 2 | 103 |
| 3 | 25 | 55 | 31 | 95.3 | 215 | 104 |
| 4 | 25 | 55 | 31 | 98.0 | 75 | 105 |
| 5 | 24 | 80 | 46 | 94.0 | 180 | 103 |
| 6 | 23 | 50 | 30.5 | 95.6 | 89 | 104 |
| 7 | 25 | 50 | 30 | 96.5 | 90 | 104 |
| 8 | 25 | 55 | 31 | 92.0 | 86 | 105 |
| 9 | 25 | 50 | 32 | 85.0 | 85 | 103 |
| 10 | 25 | 50 | 31 | 93.0 | 94 | 104 |

[1]first introduced:
[2]gγ-ABM per ml of solvent in dropping funnel
[3]H$_2$O added to dissolve the dihydroresorcinol:
[4]conc. hydrochloric acid for precipitation of the cyclic dione
[5]yield after re-crystallization from benzene Examples 11, 12    Cyclization of γ-Acetylcarboxylic acid esters

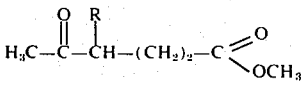

| Example | R | Solvents [1] DMF ml | Ester/DMF g/ml | Condensation-agent NaOCH₃ g | reaction(-) time min |
|---|---|---|---|---|---|
| 11 | $CH_3$ | 250 | 53/100 | 20 | 60 |
| 12 | φ | 250 | 73/100 | 20 | 60 |

| Example | temperature °C | H₂O[3] ml | conc.HCl[4] ml | yield[5] % d. Theory | space-time yield g/l·h | Fp. °C | Blg.-pt. °C/8 torr |
|---|---|---|---|---|---|---|---|
| 11 | 35 | 60 | 30.5 | 94.5 | 100 | | 135 |
| 12 | 35 | 60 | 30 | 95.5 | 145 | 112 | |

What is claimed is:

1. Process for preparing cyclohexanediones-(1,3) having the formula

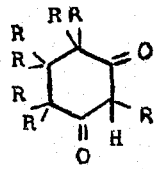

wherein
the individual radicals R may be identical or different and represent — each — a hydrogen atom, an alkyl group or an aryl group
by reaction of a γ-acyl-carboxylic acid ester having the formula

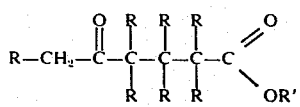

wherein R has the aforesaid meaning and R' is an alkyl group or an aryl group, with a strongly basic condensation agent in the presence of a solvent consisting essentially of a member of one of the following groups.

a. carboxylic acid amides having the formula

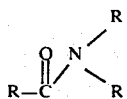

wherein the individual radicals R may be identical or different and represent — each — a hydrogen atom, an alkyl group or an aryl group b. phosphoric acid amides having the formula

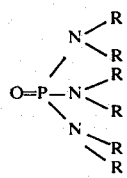

wherein the individual radicals R may be identical or different and represent — each — an alkyl group or an aryl group, c. sulfoxides and sulfones having the formula

    and    

wherein the individual radicals R may be identical or different and represent — each — an alkyl or an aryl group, and d. macrocyclic polyethers, said solvent being removed from the reaction product upon completion of the cyclization reaction and thereafter acidifying the reaction product to obtain said cyclohexanediones.

2. The process of claim 1 wherein the solvent consists of at least 50% of said (a) carboxylic acid amides, (b) phosphoric acid amides, (c) sulfoxides and sulfones, and (d) macrocyclic polyethers.

3. Process according to claim 2, which comprises using alkali metals or alkaline earth metals or of their alcoholates, amides or hydrides as condensing agents.

4. Process according to claim 2 which comprises using dimethyl formamide, dimethyl acetamide or N-methylpyrrolidone as solvent.

5. Process according to claim 2 which comprises using hexamethyl phosphoric triamide as solvent.

6. Process according to claim 2 which comprises using dimethylsulfoxide as solvent.

7. Process according to claim 2 which comprises using sulfolane as solvent.

8. Process according to claim 2 which comprises using cyclohexyl-18-crown-6-ether as solvent.

9. The process as defined in claim 2 and wherein the solvent is used in an excess from 10:1 to 10,000:1 based on the amount of initial ester.

10. The process as defined in claim 2 wherein the γ-acyl-carboxylic acid ester is reacted with a strongly basic condensation agent selected from the group consisting of alkali metals, alkaline earth metals, and their alcoholates, amides and hydrides wherein the reaction is carried out in the presence of a solvent containing at least 50% of a carboxylic acid amide selected from the group consisting of dimethylformamide, dimethylacetamide, N-methylpyrrolidone, hexamethyl phosphoric triamide, dimethyl sulfoxide, sulfolane and cyclohexyl-18-crown-6-ether said solvent is used in an excess from 10 to 1 to 10,000 to 1 based on the amount of initial ester and the reaction is carried out at a temperature between 0° and 150°C.

11. The process for preparing cyclohexanediones(1,3) having the formula

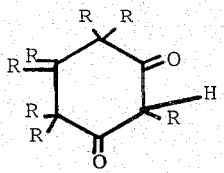

wherein the individual radicals R may be identical or different and each represents a hydrogen atom, an alkyl group or an aryl group, by reaction of a γ-acyl-carboxylic acid ester having the formula

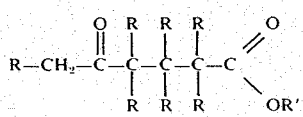

wherein R has the aforesaid meaning and R' is an alkyl group or an aryl group, with a strongly basic condensation agent in the presence of a solvent comprising at least 50% of a member of one of the following groups:

a. carboxylic acid amides having the formula

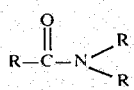

wherein the individual radicals R may be identical or different and each represents a hydrogen atom, an alkyl group or an aryl group, b. phosphoric acid amides having the formula

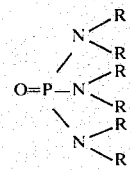

wherein the individual radicals R may be identical or different and each represents an alkyl group or an aryl group, c. sulfoxides and sulfones having the formula

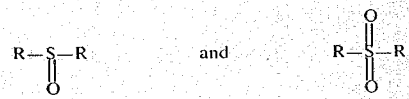

wherein the individual radicals R may be identical or different and each represents an alkyl or an aryl group, and d. macrocyclic polyethers; and up to 50% of a solvent which is a member selected from the group consisting of methanol, diethyl ether, acetonitrile and benzene, said solvent being removed from the reaction product upon completion of the cyclization reaction and thereafter acidifying the reaction product to obtain said cyclohexanediones.

* * * * *